United States Patent
Hu et al.

(10) Patent No.: US 11,004,259 B2
(45) Date of Patent: May 11, 2021

(54) ESTIMATING DIMENSIONS OF GEO-REFERENCED GROUND LEVEL IMAGERY USING ORTHOGONAL IMAGERY

(71) Applicant: HOVER INC., San Francisco, CA (US)

(72) Inventors: Bo Hu, Sunnyvale, CA (US); Sarthak Sahu, San Francisco, CA (US)

(*) Notice: Subject to any disclaimer, the term of this patent is extended or adjusted under 35 U.S.C. 154(b) by 135 days.

(21) Appl. No.: 15/025,132

(22) PCT Filed: Oct. 24, 2014

(86) PCT No.: PCT/US2014/062253
§ 371 (c)(1),
(2) Date: Mar. 25, 2016

(87) PCT Pub. No.: WO2015/061735
PCT Pub. Date: Apr. 30, 2015

(65) Prior Publication Data
US 2016/0292868 A1   Oct. 6, 2016

Related U.S. Application Data

(60) Provisional application No. 61/895,819, filed on Oct. 25, 2013.

(51) Int. Cl.
*G06T 17/00* (2006.01)
*G06T 17/20* (2006.01)
(Continued)

(52) U.S. Cl.
CPC ............ *G06T 17/00* (2013.01); *G06T 1/0007* (2013.01); *G06T 7/75* (2017.01); *G06T 17/20* (2013.01);
(Continued)

(58) Field of Classification Search
CPC ..... G06T 7/75; G06T 2219/012; G06T 17/00; G06T 17/05; G06T 17/20; G06T 19/20
See application file for complete search history.

(56) References Cited

U.S. PATENT DOCUMENTS

| 8,139,111 B2 | 3/2012 | Oldroyd |
| 8,145,578 B2 | 3/2012 | Pershing et al. |

(Continued)

FOREIGN PATENT DOCUMENTS

WO   2007147830 A1   12/2007

OTHER PUBLICATIONS

Murillo et al., "Visual Door Detection Integrating Appearance and Shape Cues", Dec. 2007, Elsevier, vol. 56, No. 6, pp. 512-521.*

(Continued)

*Primary Examiner* — Vu Nguyen
*Assistant Examiner* — Jonathan M Cofino

(57) ABSTRACT

A system and method is provided for measurements of building façade elements by combining ground-level (201) and orthogonal imagery (906). The measurements of the dimension of building façade elements are based on ground-level imagery that is scaled and geo-referenced using orthogonal imagery (209). The method continues by creating a tabular dataset (1002) of measurements for one or more architectural elements such as siding (e.g., aluminum, vinyl, wood, brick and/or paint), windows or doors. The tabular dataset can be part of an estimate report (1002).

11 Claims, 12 Drawing Sheets

(51) Int. Cl.
*G06T 7/73* (2017.01)
*G06T 1/00* (2006.01)
(52) U.S. Cl.
CPC *G06T 2207/10004* (2013.01); *G06T 2210/04* (2013.01); *G06T 2219/012* (2013.01)

(56) References Cited

U.S. PATENT DOCUMENTS

| | | | |
|---|---|---|---|
| 8,749,580 B1 | 6/2014 | Lininger | |
| 10,621,463 B2 | 4/2020 | Adams et al. | |
| 2005/0099630 A1* | 5/2005 | Reynolds | G06Q 30/02 356/402 |
| 2006/0061566 A1* | 3/2006 | Verma | G06T 17/00 345/419 |
| 2008/0221843 A1 | 9/2008 | Shenkar et al. | |
| 2009/0110267 A1 | 4/2009 | Zakhor et al. | |
| 2009/0153549 A1* | 6/2009 | Lynch | G06T 15/205 345/419 |
| 2009/0322742 A1 | 12/2009 | Muktinutalapati et al. | |
| 2010/0201682 A1* | 8/2010 | Quan | G06T 15/04 345/419 |
| 2011/0037639 A1 | 2/2011 | Duran Toro et al. | |
| 2011/0064312 A1* | 3/2011 | Janky | G01C 15/00 382/195 |
| 2012/0041722 A1* | 2/2012 | Quan | G06T 17/05 703/1 |
| 2012/0101783 A1* | 4/2012 | Stephens | G06F 17/5004 703/1 |
| 2012/0163656 A1* | 6/2012 | Wang | G01C 15/00 382/103 |
| 2012/0237083 A1* | 9/2012 | Lange | G06K 9/00805 382/103 |
| 2012/0257792 A1 | 10/2012 | Simon | |
| 2013/0179206 A1 | 7/2013 | Harper et al. | |
| 2013/0191292 A1* | 7/2013 | Meadow | G06T 17/05 705/306 |
| 2014/0023280 A1* | 1/2014 | Lin | G06F 17/30262 382/218 |

OTHER PUBLICATIONS

International Searching Authority; International Search Report and Written Opinion; International Application No. PCT/US2014/62253; dated Feb 3, 2015; 9 pgs.

"A tool to measure dimensions of buildings in various scales for Google Earth Plug-ins and 3D maps" https://groups.google.com/forum/#!topic/google-earth-browser-plugin/frIvZQ-m381, 2 pages.

Wang et al., "Large Scale Urban Modeling by Combining Ground Level Panoramic and Aerial Imagery".

Scope Technologies/Solutions: "Construction Estimate Assistance" http://www.myscopetech.com/solutions.php, 2 pages.

Huang and Wu, et al., "Towards 3D City Modeling through Combining Ground Level Panoramic and Orthogonal Aerial Imagery," 2011 Workshop on Digital Media and Digital Content Management, pp. 66-71, 6 pages.

International Bureau; International Preliminary Report on Patentability; International Application No. PCT/US14/062253; dated May 6, 2016; 8 pgs.

Hegarty et al, "Triangle Grouping and Structure Recovery for 3D Building Modelling and Visualization," 5th International Workshop on Web and Wireless GIS (W2GIS2005), Springer-Verlag LNCS; Lausann, Switzerland. Dec. 2005.

* cited by examiner

| Label | Opening | Width | Height | Feature/Comments | Price |
|---|---|---|---|---|---|
| A | Window | 36" | 60" | Colonial Grille | $250 |
| B | Window | 36" | 60" | Colonial Grille | $250 |
| C | Window | 36" | 60" | Colonial Grille | $250 |
| D | Window | 30" | 60" | Colonial Grille | $250 |
| E | Door | 30" | 72" | Aluminum/Glass | $500 |
| F | Window | 30" | 60" | Colonial Grille | $250 |
| G | Window | 36" | 60" | Colonial Grille | $250 |
| H | Window | 36" | 60" | Colonial Grille | $250 |
| I | Window | 36" | 60" | Colonial Grille | $250 |

ESTIMATING DIMENSIONS OF GEO-REFERENCED GROUND LEVEL IMAGERY USING ORTHOGONAL IMAGERY

CROSS REFERENCE TO RELATED APPLICATIONS/INCORPORATION BY REFERENCE

The present International Patent Application claims priority pursuant to 35 U.S.C. § 119(e) to U.S. Provisional Application No. 61/895,819, entitled "Estimating Dimensions of Geo-Referenced Street-Level Imagery Using Orthogonal Imagery," filed Oct. 25, 2013, which is hereby incorporated herein by reference in its entirety and made part of the present International Patent Application for all purposes.

The present International Patent Application is related to U.S. Utility patent application Ser. No. 14/339,127, entitled, "Generating 3D Building Models With Ground Level and Orthogonal Images," filed Jul. 23, 2014, which is hereby incorporated herein by reference in its entirety and made part of the present International Application for all purposes.

BACKGROUND

Technical Field

The technology described herein relates generally to a system and method for estimating dimensions of buildings, and in particular to a system and method for estimating façade elements of buildings using ground-level and orthogonal imagery.

Description of Related Art

Location-based technologies and mobile technologies are often considered the center of the technology revolution of this century. Essential to these technologies is a way to best present location-based information to devices, particularly mobile devices. The technology used to represent this information has traditionally been based on a two dimensional (2D) map.

Some efforts have been made to generate three-dimensional (3D) maps of urban cities with accurate 3D textured models of the buildings via aerial imagery or specialized camera-equipped vehicles. However, these 3D maps have limited texture resolution, geometry quality, accurate geo-referencing and are expensive, time consuming and difficult to update and provide no robust real-time image data analytics for various consumer and commercial use cases.

DETAILED DESCRIPTION

Figure 1:
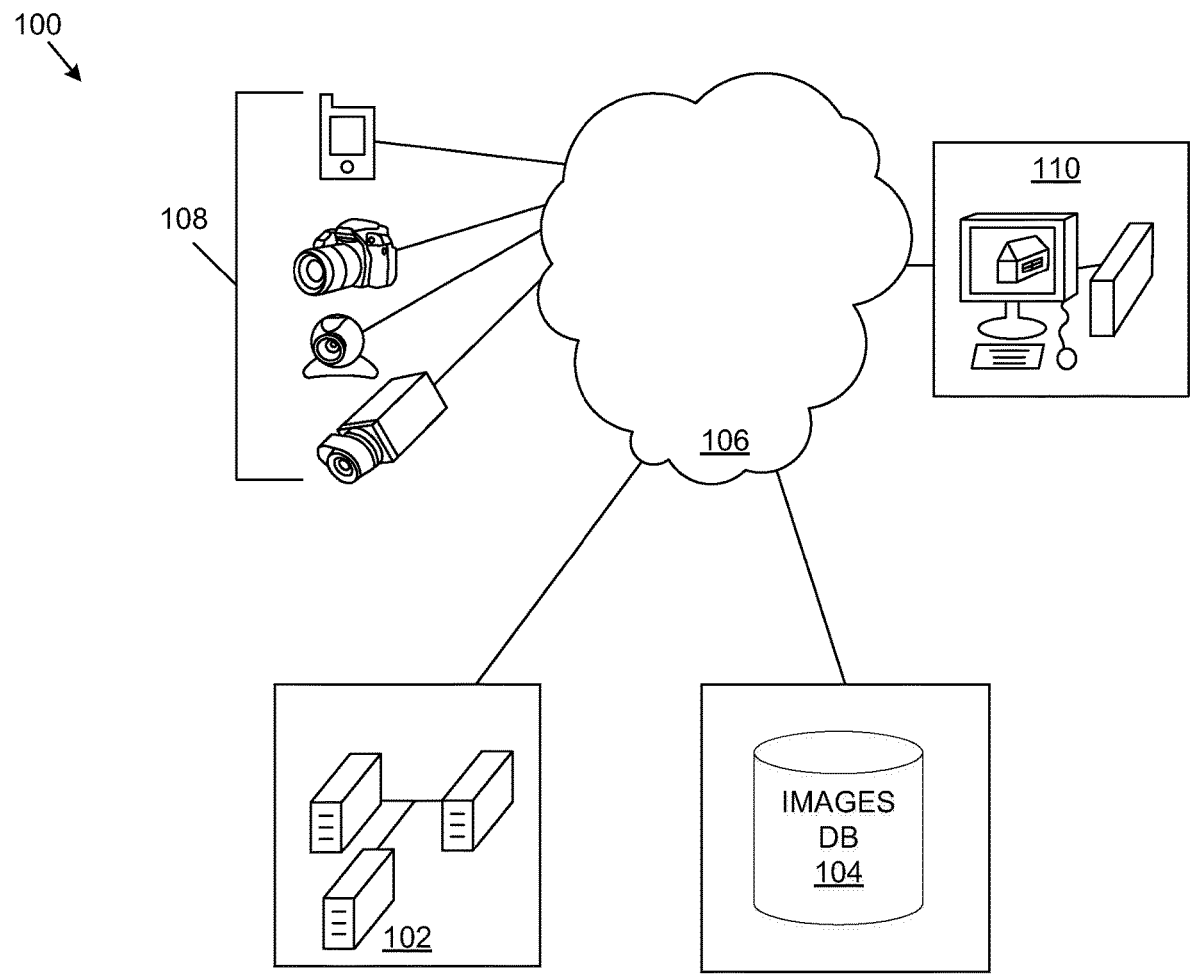
FIG. 1 illustrates one embodiment of a system architecture in accordance with the present disclosure.

FIG. 1 illustrates one embodiment of system architecture in accordance with the present disclosure. In one embodiment, image processing system 100 includes image processing servers 102. Image database (DB) 104 and image processing servers 102 are coupled via a network channel 106.

Network channel 106 is a system for communication. Network channel 106 includes, for example, an Ethernet or other wire-based network or a wireless NIC (WNIC) or wireless adapter for communicating with a wireless network, such as a WI-FI network. In other embodiments, network channel 106 includes any suitable network for any suitable communication interface. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, network channel 106 can be a wireless PAN (WPAN) (such as, for example, a BLUETOOTH WPAN), a WI-FI network, a WI-MAX network, a 3G or 4G network, LTE, a cellular telephone network (such as, for example, a Global System for Mobile Communications (GSM) network).

In one embodiment, network channel 106 uses standard communications technologies and/or protocols. Thus, network channel 106 can include links using technologies such as Ethernet, 802.11, worldwide interoperability for microwave access (WiMAX), 3G, 4G, LTE, CDMA, digital subscriber line (DSL), etc. Similarly, the networking protocols used on network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one or more embodiments, image processing servers 102 include suitable hardware/software in the form of circuitry, logic gates, and/or code functions to process ground-level images to include, but not limited to, geo-referencing and calculation of one or more image measurements according to a geo-referenced orthogonal image. Capture device(s) 108 is in communication with image processing servers 102 for collecting images of building objects. Capture devices 108 are defined as electronic devices for capturing images. For example, the capture devices include, but are not limited to: a camera, a phone, a smartphone, a tablet, a video camera, a security camera, a closed-circuit television camera, a computer, a laptop, a webcam, wearable camera devices, photosensitive sensors, equivalents or any combination thereof.

Image processing system 100 also provides for viewer device 110 that is defined as a display device. For example, viewer device 110 can be a computer with a monitor, a laptop, a touch screen display, a LED array, a television set, a projector display, a wearable heads-up display of some sort, or any combination thereof. In one or more embodiments, the viewer device includes display of one or more building facades and associated measurements, such as, for example, a conventional desktop personal computer having input devices such as a mouse, keyboard, joystick, or other such input devices enabling the input of data and interaction with the displayed images and associated measurements.

In one embodiment, an image processing system is provided for uploading to image processing system 100 ground-level images of a physical building from a capture device. An uploaded image is, for example, a digital photograph of a physical building, for example, a façade (side) of the physical building.

Figure 2:
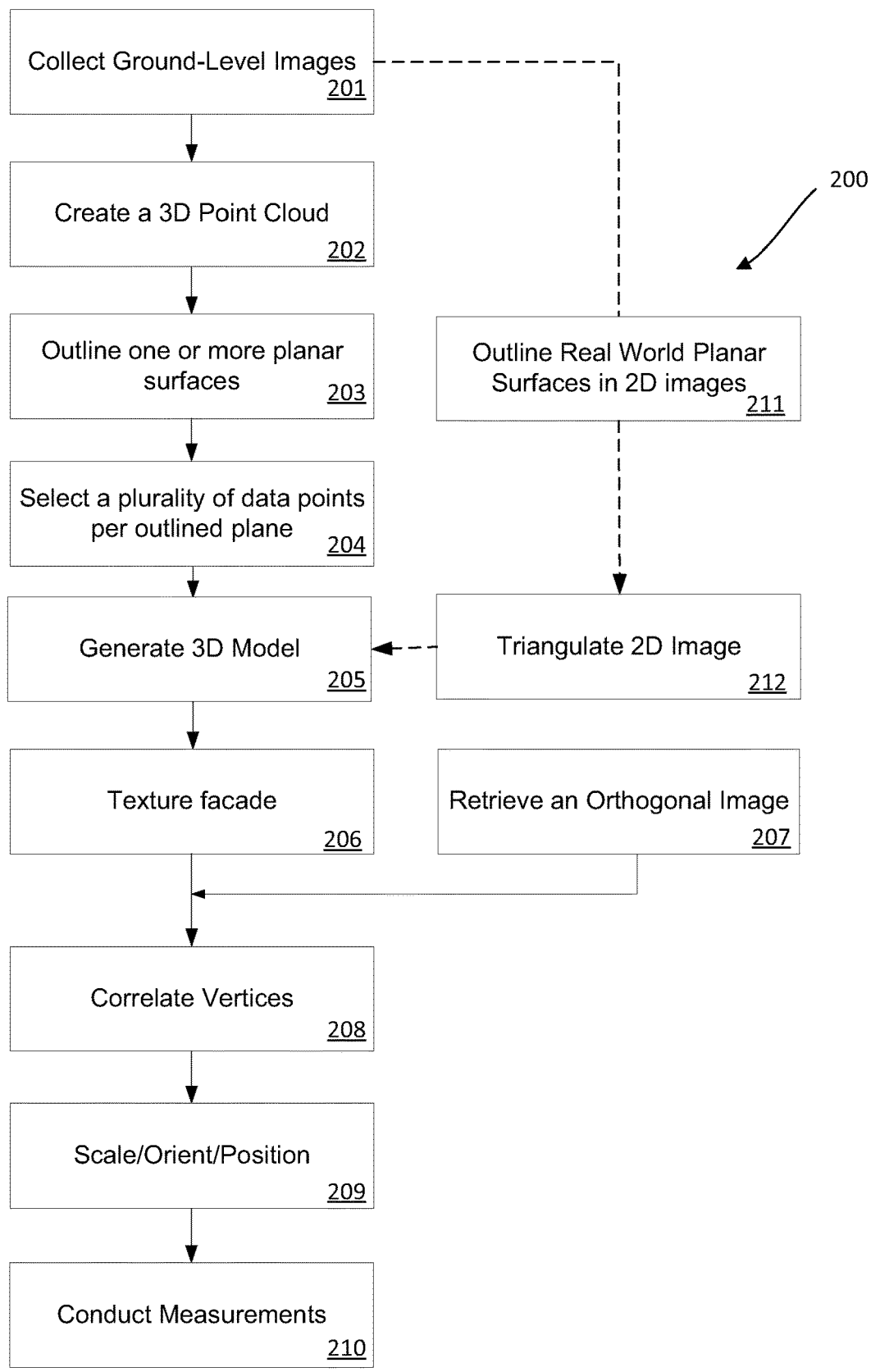
FIG. 2 illustrates a flowchart representing the process for accurately texturing a 3D building model in accordance with the present disclosure.

FIG. 2 illustrates a flowchart representing the process for accurately texturing and measuring a 3D building model in accordance with the present disclosure. Process 200 begins with image processing system 100 collecting a plurality of ground-level images of at least one side of a building object (e.g., the façade of a building object) in step 201. In step 202, image processing system 100 instantiates a 3D dense point cloud of the building object as created from the plurality of collected ground-level images. In one embodiment, key architectural geometric features of 3D point cloud are identified. Architectural features include, but are not limited to: roof intersection vertices, ground intersection vertices, bay window vertices, overhanging vertices. In alternative embodiments, the identification of architectural geometric features is performed semi-automatically, manually by a reviewer, or fully automatically.

In step 203, the boundaries of at least a single planar surface are outlined by determining the points/pixels of the single planar surface. The single planar surface of the building model is determined by selecting a plurality of data points from the dense point cloud that are part of a single planar surface in step 204. With the planer geometry defined, the ground-level images are used to create a 3D building model in step 205 which is textured in step 206.

In a separate step 207, a geo-referenced orthogonal image for the building is retrieved (e.g., from image database (DB) 104). In step 208, the corners/edges of the orthogonal image are correlated with the plurality of vertices of the first single planar surface. The vertices/edges of each planar surface can be manually selected or determined using known image processing algorithms. In step 209, the correlation of the orthogonal image is used to extract scale, orientation (rotation) and position (coordinate information) for the building model. The geo-referenced building is provided, where each pixel of the building is represented in three-dimensional space (i.e., having an x, y and z coordinate) to conduct measurements between pixels of one or more identified features of the geo-referenced building façade in step 210.

In an alternative embodiment, the 3D building model can be built (211) from real world outlined planar surfaces (2D images) which are triangulated 212 using, for example, 3D plane vertex triangulation. Additional sources of 3D building models include vanishing point-based planar rectification or 3rd party sources. The technology described herein is not limited by the source or method to obtain a 3D building model.

Figure 3:
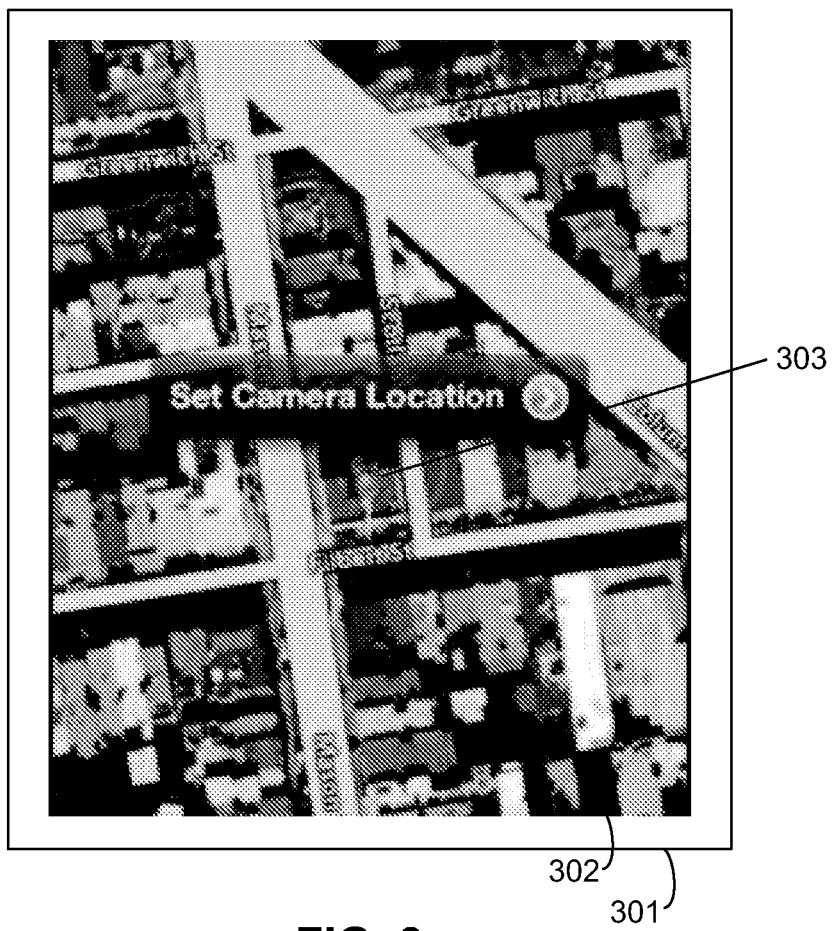
FIG. 3 illustrates a diagram of geo-referencing a building location in accordance with the present disclosure.

FIG. 3 illustrates a diagram of geo-referencing a building location in accordance with the present disclosure. In one embodiment, ground-level images are uploaded from capture device 301 (shown as 108 in FIG. 1). In one embodiment, images are captured as the picture taker moves around the building—taking a plurality (e.g., 4-16 for an entire building) of images from multiple angles and distances. In one embodiment, pictures include one corner and one or more sides in partial view (perspective). In one embodiment, the capture devices directly upload images to image processing system 100 via a network channel as illustrated in FIG. 1. In another embodiment, images are indirectly uploaded to image processing system 100 of FIG. 1. For example, the images are uploaded to a computer or a server from third party image services (e.g. Flickr, Facebook, Twitter, etc.) first before being uploaded to image processing system 100. For another example, the images are transferred from a camera first to a networked computer, and then the images are transferred to image processing system 100.

In one embodiment, capture devices include a global positioning satellite (GPS) system for providing location information. The capture device 301 is used to identify a location using the GPS information of a current location. As shown in FIG. 3, the capture device displays map 302 showing its current location 303. In one embodiment, confirmation of the GPS determined location information is required. In alternative embodiments, the location of a building is determined by manually typing in an address or selecting a point on a map (e.g., 302).

Figure 4:
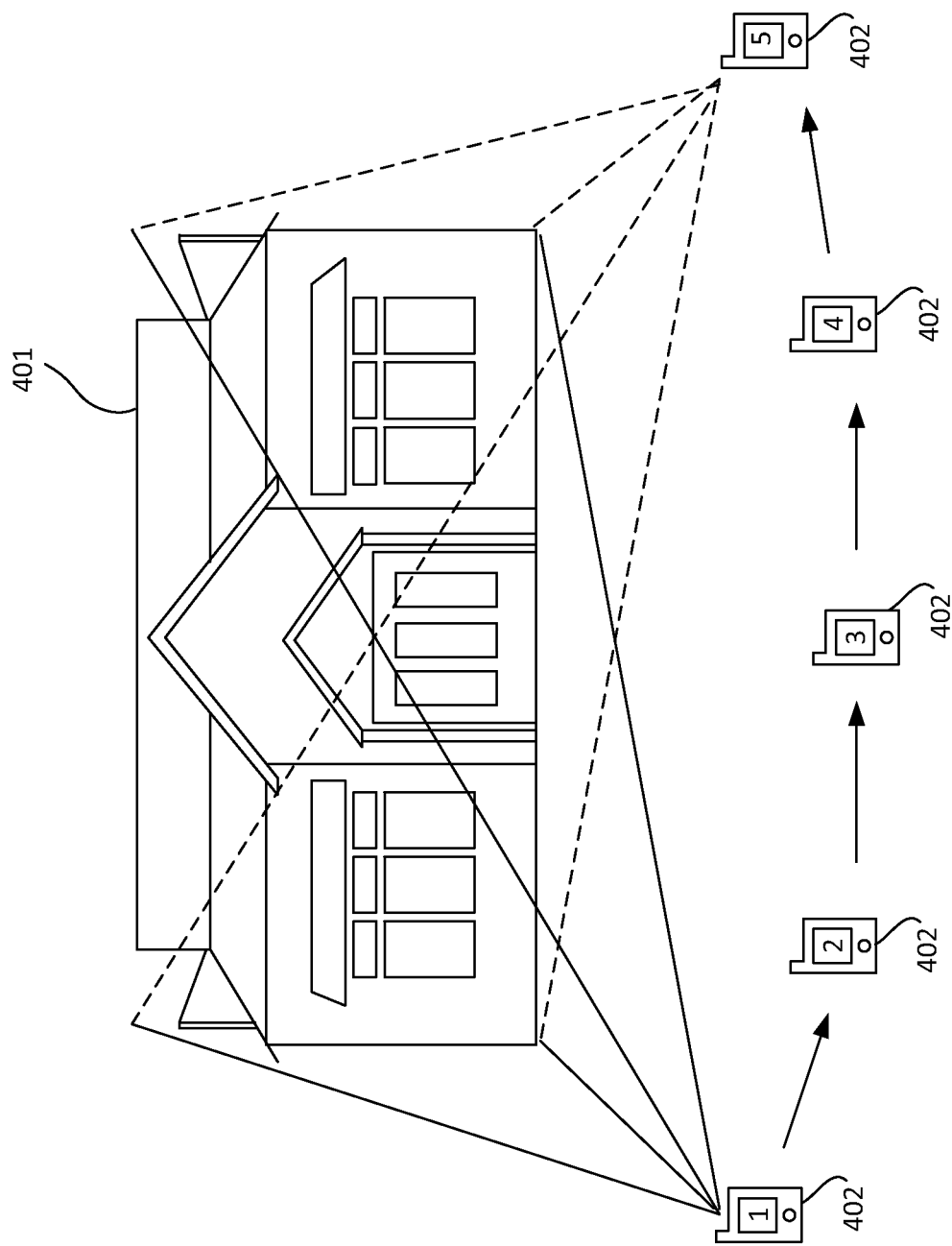
FIG. 4 illustrates a diagram of capturing ground-level images of a building object in accordance with the present disclosure.

FIG. 4 illustrates a diagram of capturing ground-level images of a building object in accordance with the present disclosure. A plurality of ground-level images for a façade of building object 401 are collected by capture device 402. Each ground-level image is taken at a different perspective relative to the other images of the façade. For example, capture device 402 collects ground-level images at a first position, a second position, a third position, a fourth position and a fifth position (as shown 1, 2, 3, 4, 5).

Figure 5:
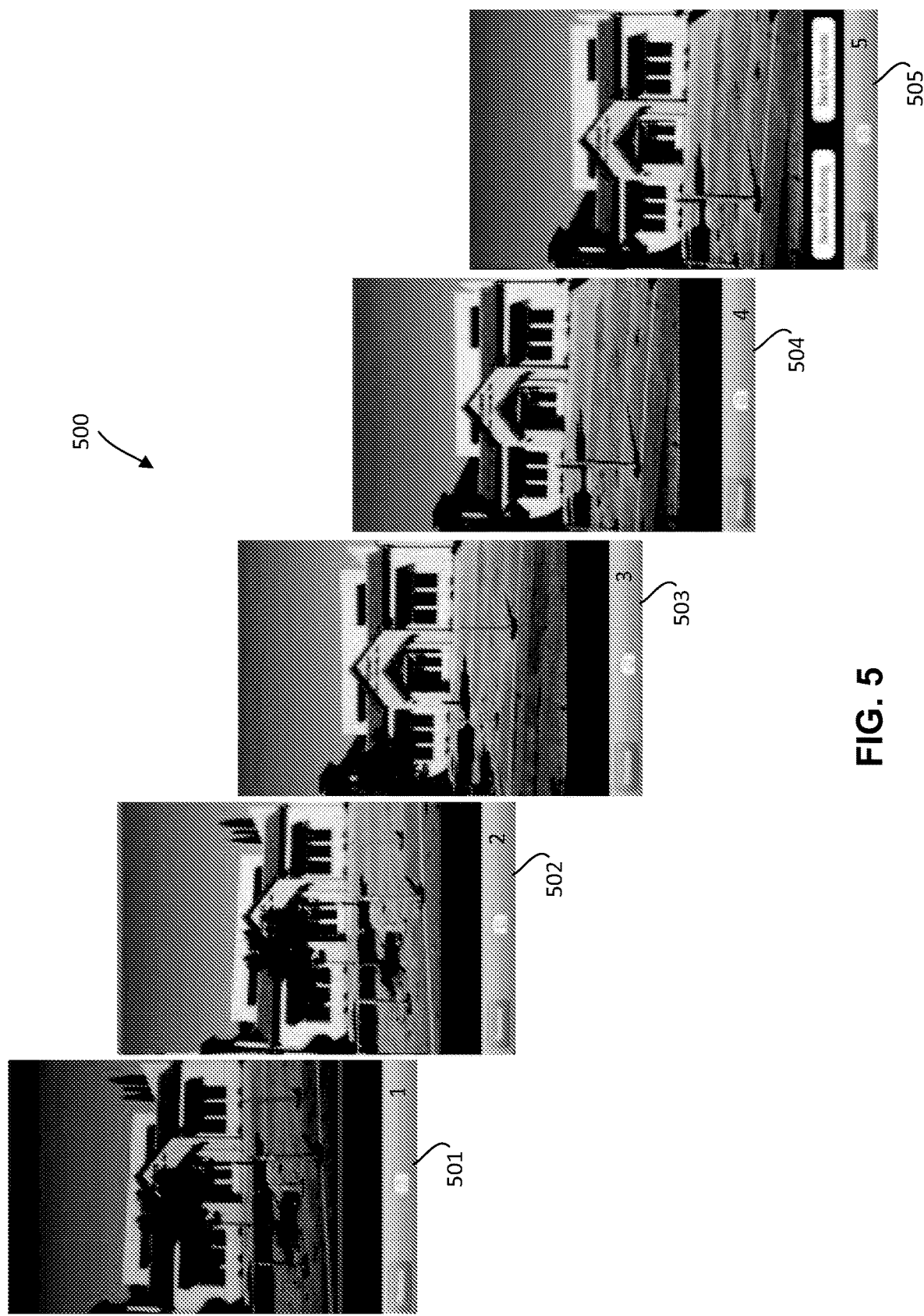
FIG. 5 illustrates an example of collected ground-level images for the façade of a building in accordance with the present disclosure.

FIG. 5 illustrates an example of collected ground-level images for the façade of a building in accordance with the present disclosure. Plurality of ground-level images 500 provides for different perspectives of a building façade. Ground-level images 501 to 505 capture the building from five perspectives panning the façade of the building. Ground-level image 501 provides for the left most building façade perspective relative to the other ground-level images. Ground-level image 505 provides for the right most building façade perspective relative to the other ground-level images. Ground-level images 502 through 504 represent the building façade from three additional perspectives between ground-level images 501 and 505. Plurality of ground-level images 500 are used to create a dense 3D point cloud representing the façade of the building (FIG. 6).

In one embodiment, the plurality of ground-level images includes the boundaries of the building façade. For example, as previously described, a plurality of ground-level images is captured for a building object and includes an image from the perspective defining the far left edge of the façade and an image from the perspective defining the far right edge of the façade. Including the boundaries of the façade in the plurality of ground-level images helps define vertices/edges of the planes roughly represented by the dense point clouds created by the plurality of ground-level images. In alternative embodiments, the plurality of ground-level images captured for the building object are not required to include the boundaries of the façade in order generate the dense point cloud. In yet another embodiment, multiple facades are captured in a single image which includes the boundary vertices (corner).

In yet another embodiment, a plurality of ground-level images is collected for each side and/or corner of the building (the first side of the building typically being the primary façade of the building). For example, when a building is part of a larger collection of buildings (i.e., a townhome, a store in a strip mall, etc.) not all sides of the building are accessible for ground-level images as at least one side is shared with an adjacent building. For stand-alone building objects, a plurality of ground-level images is collected for each side and/or corner of the building object. For example, a single family home generally has 4 facades (i.e., front side (façade), back side and left/right sides) and a plurality of ground-level images collected for each side and/or corner would result in a 3D building model of the single family home having each side accurately textured.

Figure 6:
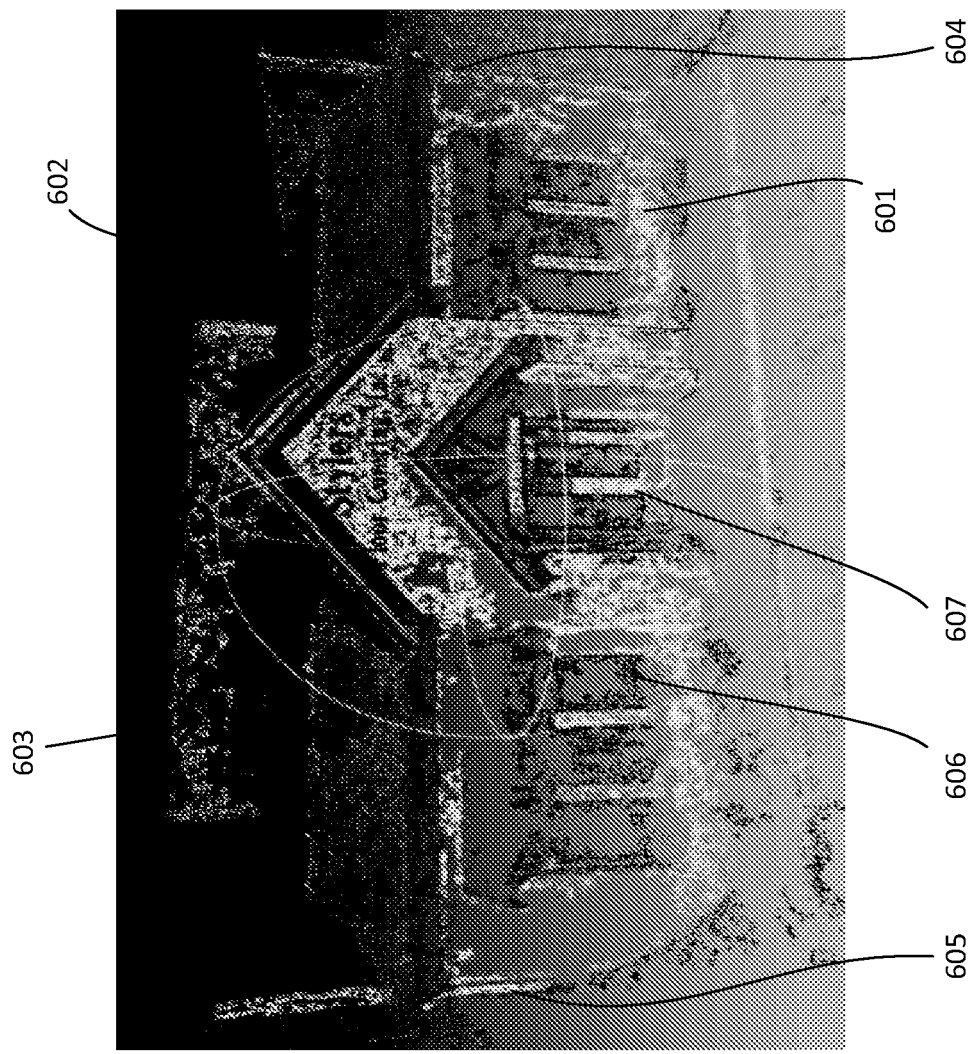
FIG. 6 illustrates a 3D point cloud of a building facade generated in accordance with the present disclosure.

FIG. 6 illustrates a 3D point cloud of a building facade generated in accordance with the present disclosure. The plurality of ground-level images collected for the building façade is used to extrapolate a dense 3D point cloud. In one example embodiment, a minimum of five (5) ground-level images of the façade is required to generate an accurate 3D point cloud representative of that building façade. In another embodiment, a minimum of five (5) ground-level images of each side is required to generate an accurate 3D point cloud representative of the building object. The multiple views of the building created by the plurality of ground-level images collected from the different perspectives allows for a 3D point cloud to depict architectural features of the corresponding building façade. For example, 3D point cloud 601 was generated using a plurality of ground-level images of the façade of the building captured from different perspectives. 3D point cloud 601 provides for potential identification of architectural features such as roof intersections 602 and 603 with the facade, wall edges 604 and 605 as well as windows 606 and doors 607. Once the point cloud is established, points on a single plane can be identified as further described in FIG. 7 and FIG. 8.

Figure 7:
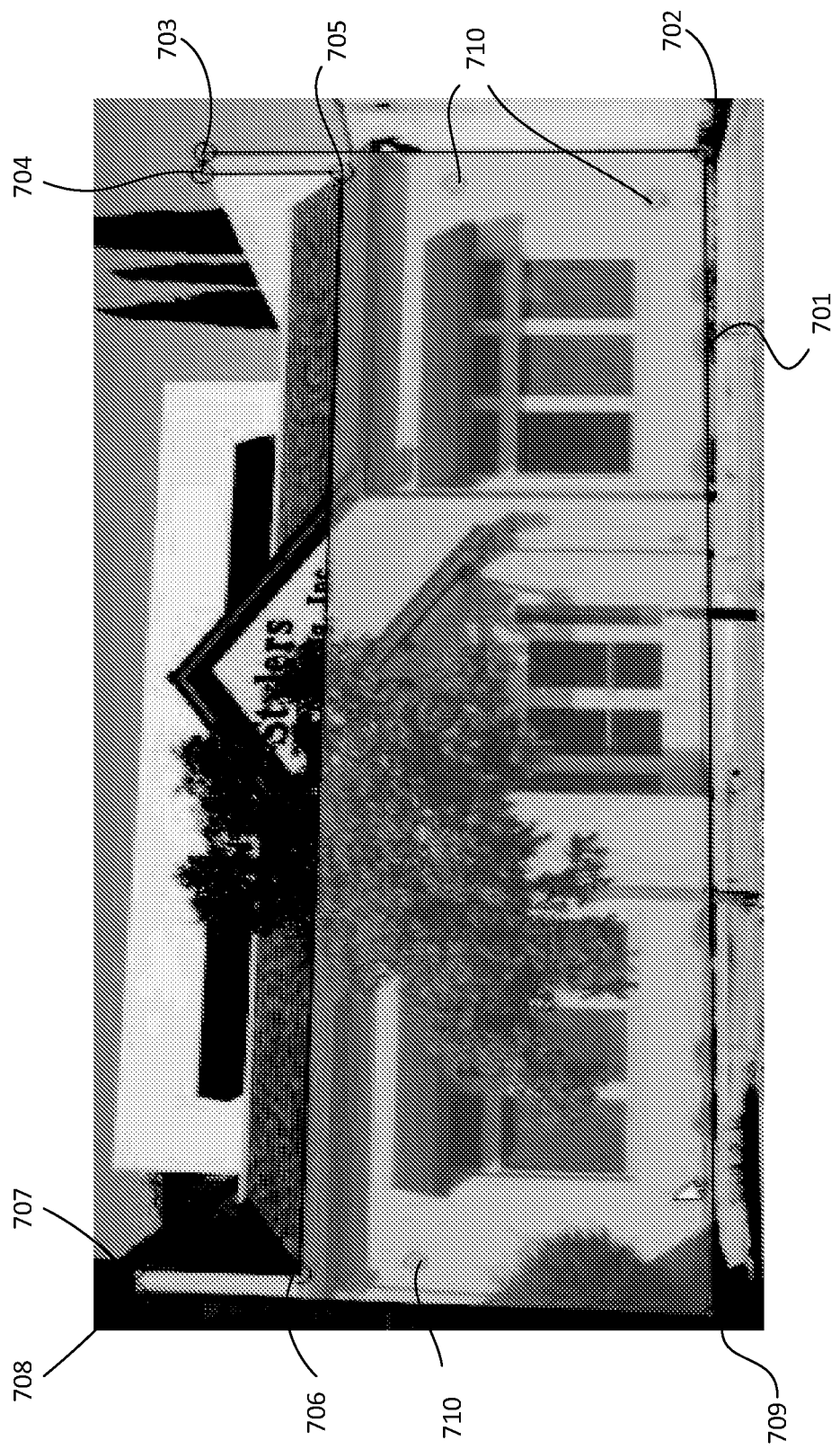
FIG. 7 illustrates an aspect embodiment of the process for texturing a 3D building model in accordance with the present disclosure.

FIG. 7 illustrates an aspect embodiment of the process for defining building plane(s) in accordance with the present disclosure. In one embodiment of the technology described herein, at least one of the collected images representing the façade of the building is projected upon the façade of the 3D building model. The planar surface boundaries are defined by selecting the vertices 702 through 709 of the building plane vertices. In addition, a plurality of data points 710 are selected for determining the planar depth and orientation.

Figure 8:
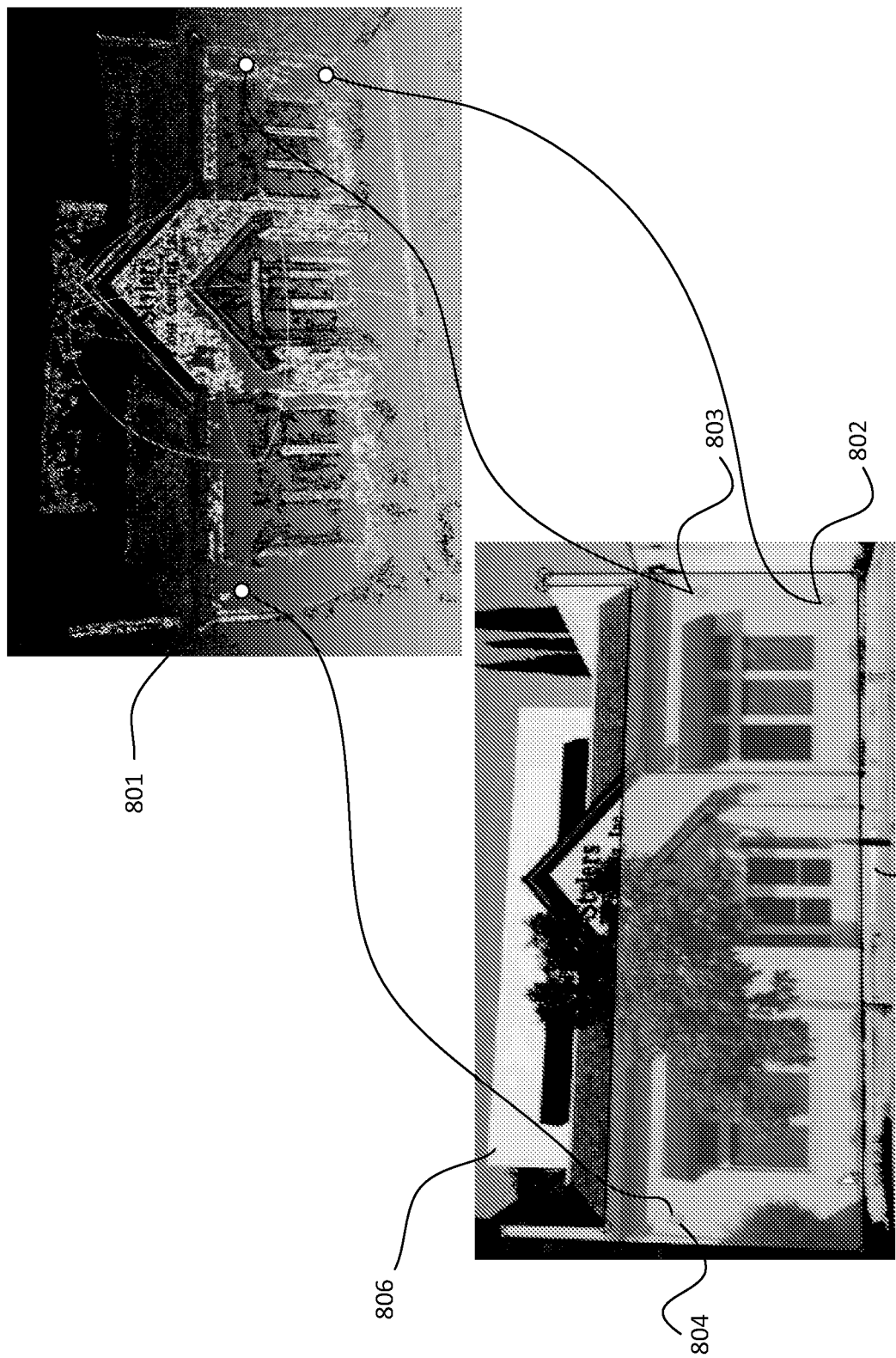
FIG. 8 illustrates another aspect embodiment of the process for texturing a 3D building model in accordance with the present disclosure.

FIG. 8 illustrates an aspect embodiment of the process for correlating data points in accordance with the present disclosure. As previously described, 3D point cloud 801 provides for distinguishing planes of the building façade. For example, a roof plane is distinguishable from a façade plane and parallel planes are distinguishable from one another. In a manual process, a plurality of data points is selected from a single plane and is used to determine a planar depth and orientation. 3D point cloud 801 includes data points generated from plurality of ground-level images collected from the different perspectives of the capture device relative to the façade of the building. A plurality of data points 802, 803 and 804 are selected from point cloud 801 to determine corners and edges of planar surface 805 of building 806. The selected plurality of data points correspond to a single plane of building 806. In another embodiment, the selection of the plurality of data points is performed semi-automatically or fully automatically.

In one embodiment, a 3D proximity buffer is applied to the data points to determine the planar surface's depth (relative) and orientation and identify those data points in the 3D point cloud that are in close proximity to the selected region. For example, when selecting a data point to determine a plane's depth, the closest data point to the selected region is used as the data point to determine the plane's depth. The data points are averaged to find an average planar fit and determine the planar surface's depth and orientation and the 3D building plane position alignment is adjusted. In another embodiment, random sample consensus (RANSAC) is used to determine the 3D proximity buffer that is applied to the data points for the determination of the planar surface's depth and orientation. Once the point cloud has been created and one or more planes have been identified, various architectural features (e.g., windows, doors) can be identified using similar processes and measured as will be detailed hereafter.

Figure 9:
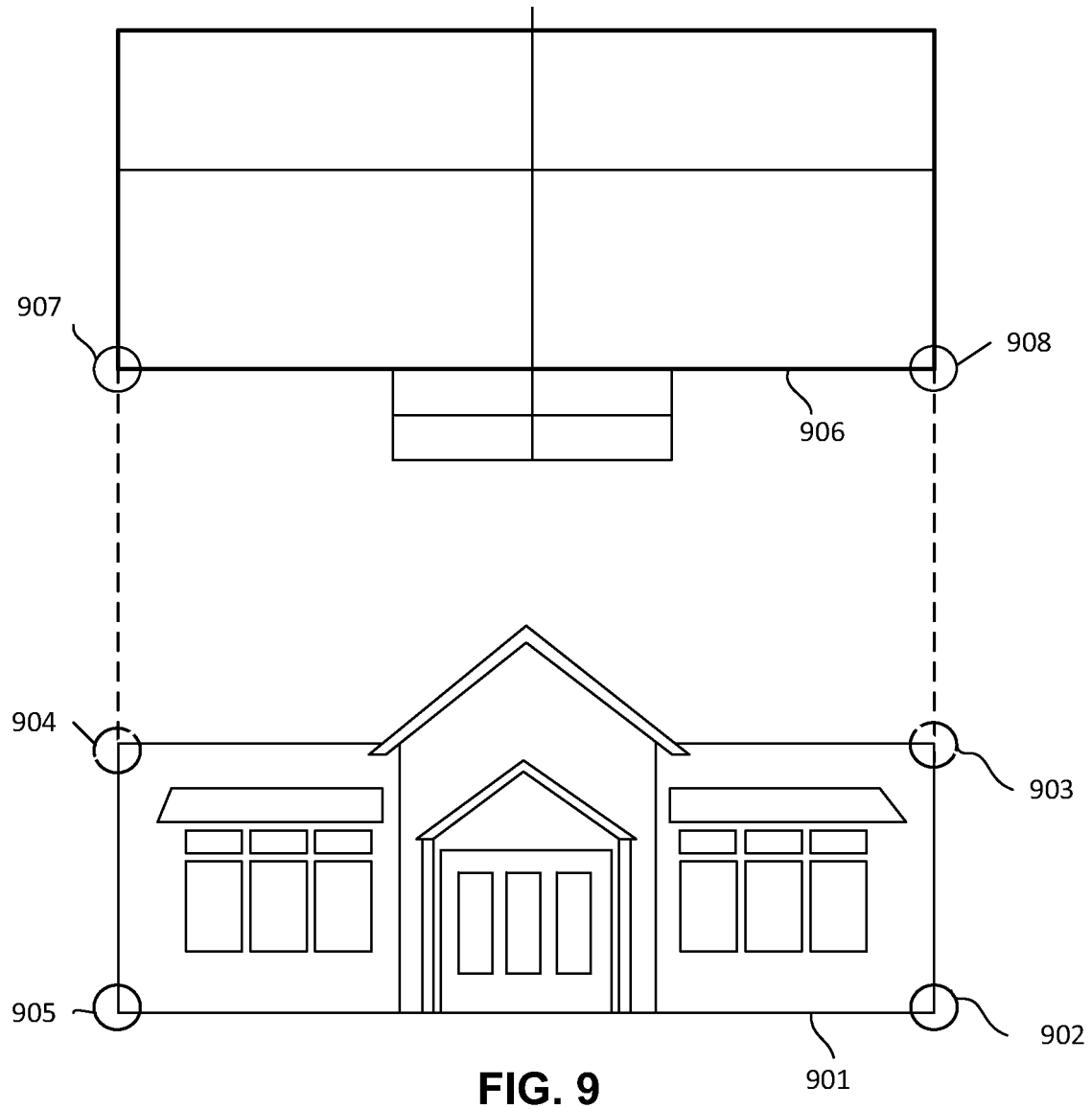
FIG. 9 illustrates an embodiment of the process for correlating points in a 3D building model in accordance with the present disclosure.

FIG. 9 illustrates an embodiment of a process for geo-referencing a ground-level building model in accordance with the present disclosure. Orthogonal images and inherent building geometry vertices/edges for building objects provide accurate scale, rotation and location information for a corresponding point cloud derived building model. Building model 901 is provided with a defined planar surface as previously described in FIGS. 7 and 8. Orthogonal image 906 (i.e., top view) of the corresponding building object is retrieved and the defined planar surface of building model 901 identified and correlated with the orthogonal image by matching vertices of the planar surface to corresponding pixels in the orthogonal image. Corner pixels 907 and 908 of the orthogonal image are selected to correlate to selected vertices 902 through 905 of building model 901, identifying those vertices as being part of the same planar surface. For example, orthogonal image corner pixel 907 is correlated with building model façade plane vertices 904 and 905 and orthogonal image corner pixel 908 is correlated with building model façade plane vertices 902 and 903. In one embodiment, orthogonal image 906 is retrieved from image database 104 of FIG. 1.

In one embodiment, pixels of the orthogonal image are geo-referenced with accurate spatial representation in the world coordinate system. Geo-referenced orthogonal images therefore include distances between coordinate points. By correlating the ground-level building façade with known geo-referenced orthogonal images, the geo-spatial position of each pixel within the ground-level building façade is determined and can be used to accurately measure various architectural features of the façade. The described embodiments are, for simplicity, described for only a single exterior façade, but can be repeated for any number of facades (sides), including the roof (top) or interior facades/surfaces and are not limited to buildings.

Figure 10:
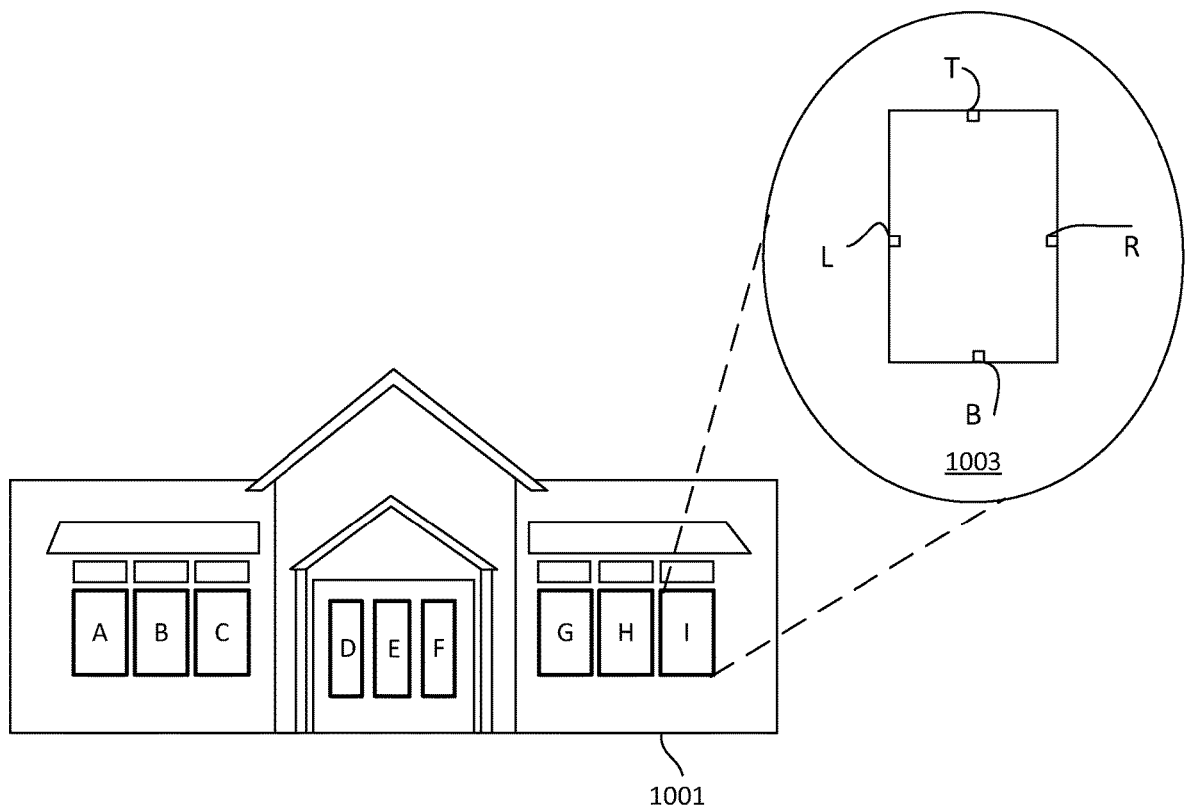
FIG. 10 illustrates an aspect embodiment of a geo-referenced building façade with tabular measurements in accordance with the present disclosure.

FIG. 10 illustrates an aspect embodiment of a geo-referenced building façade with tabular measurements in accordance with the present disclosure. Building façade 1001 represents a textured building façade where each pixel of the building façade is geo-referenced in three-dimensional space (as previously described). In various embodiments of the technology described herein, the geo-referenced building façade is used to obtain measurements. For example, window "I" is first identified using one or more of the previously described methods. As shown in breakout 1003 of window "I", to determine its measurements, the geo-referenced pixels representing its boundaries, edges top (T), bottom (B), left (L) and right (R) are identified. The measurements of window "I" are calculated by identifying the distances between the geo-referenced pixels of the boundary pixels (L–R×T–B)—in this case 36 inches×60 inches. The specific pixels chosen are shown as center boundary points for simplicity, but could include any pixel along an edge, corners, all geo-referenced pixels within the boundary of the window (area) or a sub-set of geo-referenced pixels.

In one embodiment, a dataset of measurements is provided that represents measurements from the building façade elements (architectural elements) identified within the ground-level images. Tabular dataset 1002 is shown with measurements from windows A, B, C, D, F, G, H and I and door E of the building façade. Tabular dataset 1002 is provided, for example, automatically or semi-automatically where the generation of the dataset is triggered by selecting various architectural elements of the building façade and initiating the measurements. In an automated approach, a default dataset is provided that includes measures of all identified architectural elements of the building façade. In another embodiment, measurements are provided for all building facades.

Datasets of measured building façade elements can, in one embodiment, be configured in a repair or replacement estimate report. For example, a home owner wishing to obtain an estimate for replacement windows can obtain a report using items from the dataset including windows to replace. The estimate can further include product specific pricing (e.g., using manufacturer product sizing, pricing, volume discounts, geographic variances for delivery and various levels of product quality).

In an additional example, siding (e.g., vinyl/aluminum/ wood/brick/paint) estimates can be produced by accurate sizing of major façade surfaces and architectural elements. Once the major surface sizes are known, the size of non-siding surfaces can be subtracted to determine a quantity of replacement siding needed. For example, siding needed for each side of a building equals the square footage size of the major façade surfaces minus the sizes of window, doors and other non-siding elements located on those surfaces.

In one example embodiment, dimensions are provided for the entire façade (one surface, four surfaces or more) to identify the area (e.g., square footage, square meters, etc.) of one or more surfaces of the building. In another embodiment, façade elements are represented by a series of pixels in the geo-referenced building façade or at least one pixel from the series of pixels is selected to represent a location of the façade element for the purpose of measuring between façade elements. For example, the centermost pixel (a pixel located in the center of the façade element) is used to represent the location of a facade element. In an alternative embodiment, any pixel within the buffer of a façade element is used to represent the façade element as a point (starting or ending) for measurement.

Figure 11:
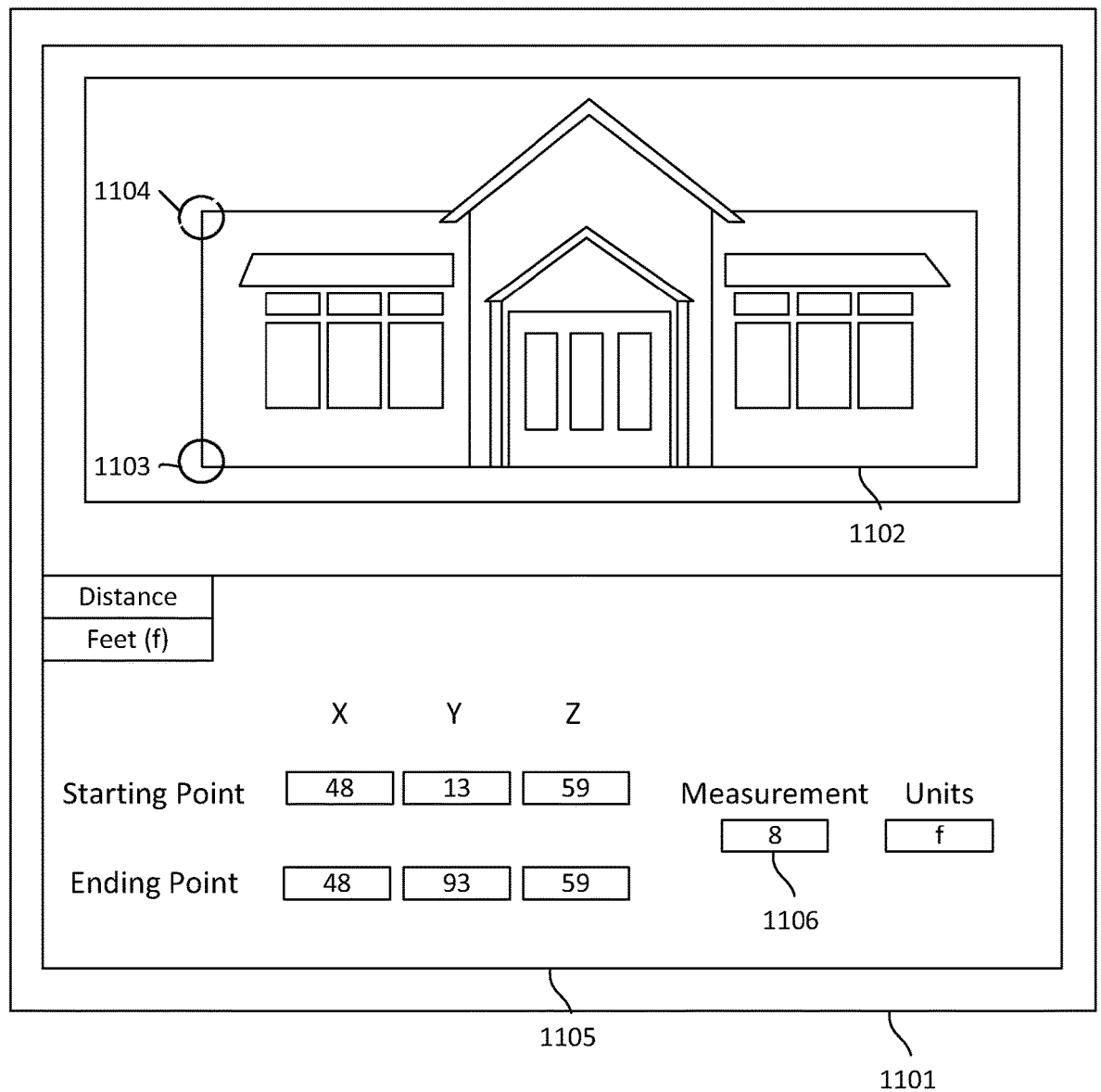
FIG. 11 illustrates an aspect embodiment of a geo-referenced building façade with interactive measuring in accordance with the present disclosure.

FIG. 11 illustrates an aspect embodiment of a geo-referenced building façade with interactive measuring in accordance with the present disclosure. In one embodiment, measurements are conducted interactively by a selecting a starting point and an ending point from geo-referenced building façade 1102. For example, a geo-referenced building facade is provided to a viewer device 1101 (e.g., a capture device, computer screen, device 110 as shown in FIG. 1, etc.) and starting point 1103 and ending point 1104 are selected on the geo-referenced building facade. In one embodiment, the starting and ending points are selected by touching a location on touch screen of viewer device 1101, using a mouse to click the selected points, inputting world coordinates, or other equivalent point selection methods.

The starting and ending points each represent a selected pixel within the geo-referenced building façade and are recorded in their corresponding coordinate values in measurement interface 1105. The pixel coordinates are compared and a measurement resulting from the difference between the positions of starting point 1102 and ending point 1103 is provided in measurement box 1106. The unit of the measurement value is determined by units menu 1107 (e.g., feet, inches, meters, centimeters, etc.). Measurement type box 1108 provides for selection of the type of measurement, for example, distance or area.

In one embodiment, measurements are provided from any starting point to any end point within the pixels of the geo-referenced building façade. In an alternative embodiment, area (e.g., square footage, square meters, etc.) is calculated by selecting three or more points in a closed selection (where the starting point and ending point are the same pixel). In one embodiment, edges of a façade element are automatically identified by the system when the architectural elements are identified. In another embodiment, the edges of a façade element are defined manually by selecting a starting point and end point for each vertices/edge.

Figure 12:
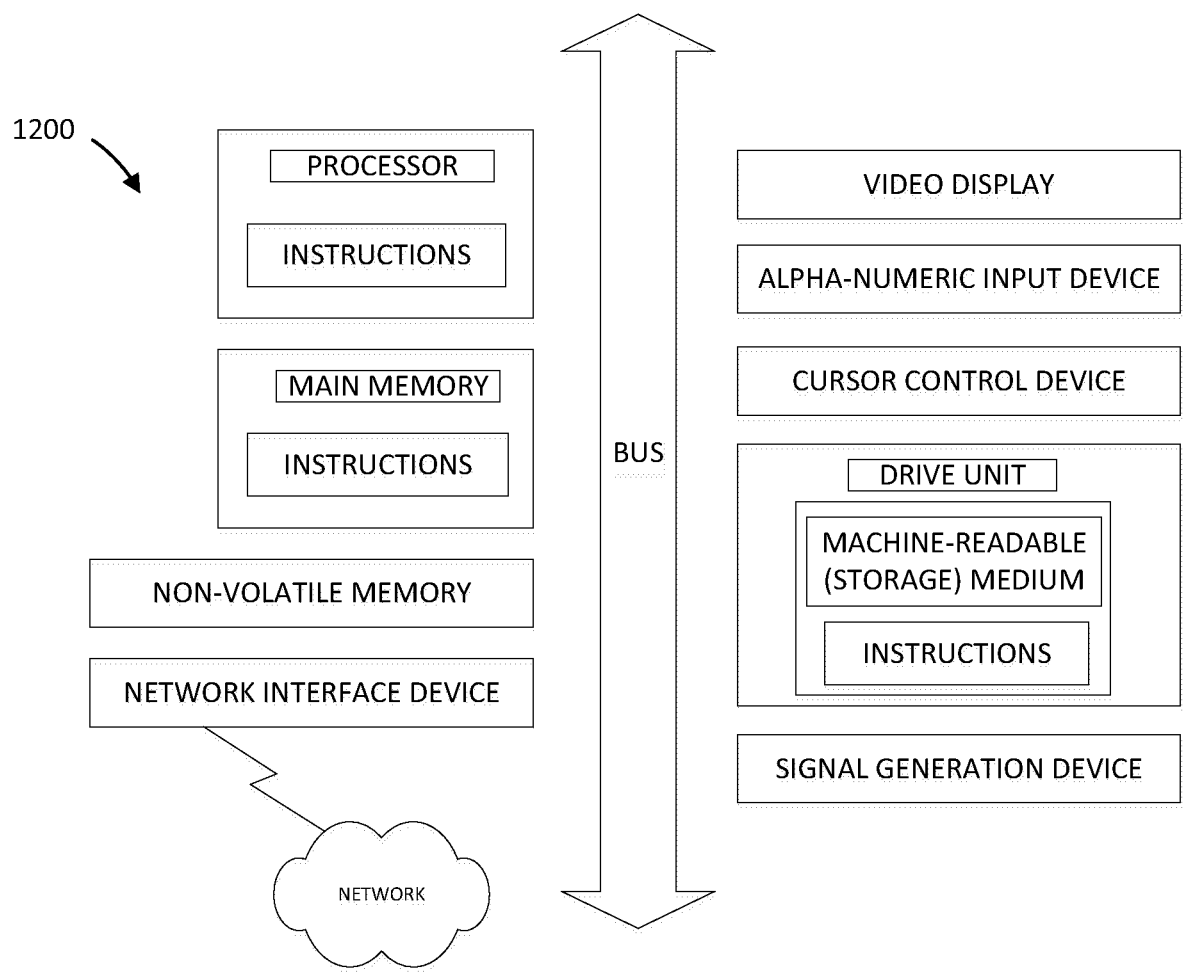
FIG. 12 illustrates a diagrammatic representation of a machine in the example form of a computer system in accordance with the present disclosure.

Referring now to FIG. 12, therein is shown a diagrammatic representation of a machine in the example form of a computer system 1200 within which a set of instructions, for causing the machine to perform any one or more of the methodologies or modules discussed herein, may be executed. Computer system 1200 includes a processor, memory, non-volatile memory, and an interface device. Various common components (e.g., cache memory) are omitted for illustrative simplicity. The computer system 1200 is intended to illustrate a hardware device on which any of the components depicted in the example of FIG. 1 (and any other components described in this specification) can be implemented. The computer system 1200 can be of any applicable known or convenient type. The components of the computer system 1200 can be coupled together via a bus or through some other known or convenient device.

This disclosure contemplates the computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1200 may include one or more computer systems 1200; be unitary or distributed; span multiple locations; span multiple machines; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1200. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the technology as described herein have been expressly described herein, other combinations of these features and functions are likewise possible. For example, the steps may be completed in varied sequences to complete the textured facades. The technology as described herein is not limited by the particular examples disclosed herein and expressly incorporates these other combinations.

What is claimed is:

1. A method of measuring in a three-dimensional building model, comprising:

collecting, using a smartphone, a plurality of ground-level images capturing all sides of a single building;

determining a location for the plurality of ground-level images;

generating an outline of a plurality of façades associated with all sides of the single building shown within the ground-level images to assist in generation of a three-dimensional building model of the single building;

generating the three-dimensional building model based on the outlined plurality of façades associated with all sides of the single building, wherein the generating the three-dimensional building model includes at least correlation and rectification of the outlined plurality of façades and representing points of the single building projected in three-dimensional space;

retrieving a geo-referenced top-view orthogonal image of the single building based on the determined location of at least one of the plurality of ground-level images;

deriving a scale as between all points of the three-dimensional building model by geo-referencing all points of the three-dimensional building model using the geo-referenced top-view orthogonal image by correlating the geo-referenced top-view orthogonal image to include matching at least two points of the three-dimensional building model to corresponding roof pixels in the geo-referenced top-view orthogonal image and identifying those matches as being part of a same feature within the three-dimensional building model of the single building;

measuring, on the scaled three-dimensional building model, between at least one starting geo-referenced point and at least one ending geo-referenced point to determine dimensions of one or more architectural elements, the dimensions including at least width and height of the one or more architectural elements, located within at least a first façade of the geo-referenced three-dimensional building model; and labeling the architectural element within the scaled three-dimensional building model, the labeling representing the determined dimensions.

2. The method of claim 1, wherein the one or more architectural elements comprise windows.

3. The method of claim 1, wherein the one or more architectural elements comprise doors.

4. The method of claim 1, further comprising creating a tabular dataset of measurements for one or more architectural elements and their respective determined measurements.

5. The method of claim 4, wherein the tabular dataset comprises one or more of default ones of the architectural elements or selectable ones of the architectural elements.

6. The method of claim 4, wherein the tabular dataset comprises one or more portions of an estimate report.

7. The method of claim 6, wherein the one or more portions of an estimate report are modified using product data.

8. The method of claim 4, wherein the tabular dataset comprises measurements for siding.

9. The method of claim 4, wherein the tabular dataset comprises measurements for paint.

10. The method of claim 1, wherein the measuring is conducted interactively by repeated selecting of at least one starting geo-referenced point and at least one ending geo-referenced point.

11. A method of measuring in a three-dimensional building model, comprising:

collecting, using a smartphone, a plurality of ground-level images capturing all sides of a single building;

determining a location for the plurality of ground-level images;

generating an outline of a plurality of façades shown within the ground-level images of all sides of the single building to assist in generation of a three-dimensional building model of the single building;

generating the three-dimensional building model based on the outlined plurality of façades, wherein the generating the three-dimensional building model includes at least correlation and rectification of the outlined plurality of façades and representing points of the single building projected in three-dimensional space;

retrieving a geo-referenced top-view orthogonal image of the single building based on the determined location of at least one of the plurality of ground-level images;

deriving a scale as between all points of the three-dimensional building model by geo-referencing all points within the three-dimensional building model by matching at least two points of the three-dimensional building model associated with at least one outlined façade to corresponding roof pixels in the geo-referenced top-view orthogonal image;

measuring, on the scaled three-dimensional building model, between at least one starting geo-referenced point and at least one ending geo-referenced point to determine dimensions of one or more architectural elements located within the plurality of façades; and labeling the one or more architectural element with the determined dimensions.

* * * * *